US012393420B2

(12) United States Patent
Körner et al.

(10) Patent No.: US 12,393,420 B2
(45) Date of Patent: Aug. 19, 2025

(54) SYSTEM AND COMPUTER-IMPLEMENTED METHOD FOR CONTROLLING A SOFTWARE DEVELOPMENT AND OPERATIONS SYSTEM ON THE BASIS OF MEASURED QUALITY DATA REPRESENTING AT LEAST ONE QUALITY AND/OR PERFORMANCE INDICATOR

(71) Applicant: Siemens Aktiengesellschaft, Munich (DE)

(72) Inventors: Christian Körner, Bergen (DE); Reinhold Plösch, Linz (AT)

(73) Assignee: Siemens Aktiengesellschaft, Munich (DE)

( * ) Notice: Subject to any disclaimer, the term of this patent is extended or adjusted under 35 U.S.C. 154(b) by 216 days.

(21) Appl. No.: 18/220,570

(22) Filed: Jul. 11, 2023

(65) Prior Publication Data
US 2024/0020118 A1    Jan. 18, 2024

(30) Foreign Application Priority Data
Jul. 15, 2022  (EP) .................................... 22185136

(51) Int. Cl.
*G06F 8/77* (2018.01)
(52) U.S. Cl.
CPC ...................................... *G06F 8/77* (2013.01)
(58) Field of Classification Search
CPC ................. G06F 8/70; G06F 8/77; G06F 8/78
(Continued)

(56) References Cited

U.S. PATENT DOCUMENTS 5,930,798 A * 7/1999 Lawler .................. G05B 17/02
707/999.102
8,121,874 B1 * 2/2012 Guheen ............... G06Q 10/087
705/28
(Continued)

FOREIGN PATENT DOCUMENTS

EP  3961382 A1  3/2022

OTHER PUBLICATIONS

Tole, Alexandru Adrian. "Big data challenges." Database systems journal 4.3 (2013). pp. 31-40 (Year: 2013).*
(Continued)

*Primary Examiner* — Satish Rampuria
(74) *Attorney, Agent, or Firm* — Schmeiser, Olsen & Watts LLP

(57) ABSTRACT

A support system includes a processor, wherein the support system is configured to process measured quality data representing at least one quality and/or performance indicator for controlling a software development and operations system, further including: a configuration module used to set up connectors to at least one history data source of the DevOps system and/or to at least one enterprise resource planning data source, an input interface module configured to import a data model including predefined model parameters with predefined initial values, a modeler module including the data model, a recommender module configured to analyze current evolution degree depending on assigned values, to estimate a quality and/or performance trend derived from the evolution degree and from the aggregated data from the at least one history data source and an output interface to output at least one message containing recommendation for at least one action to be taken.

15 Claims, 2 Drawing Sheets

Figure 1:
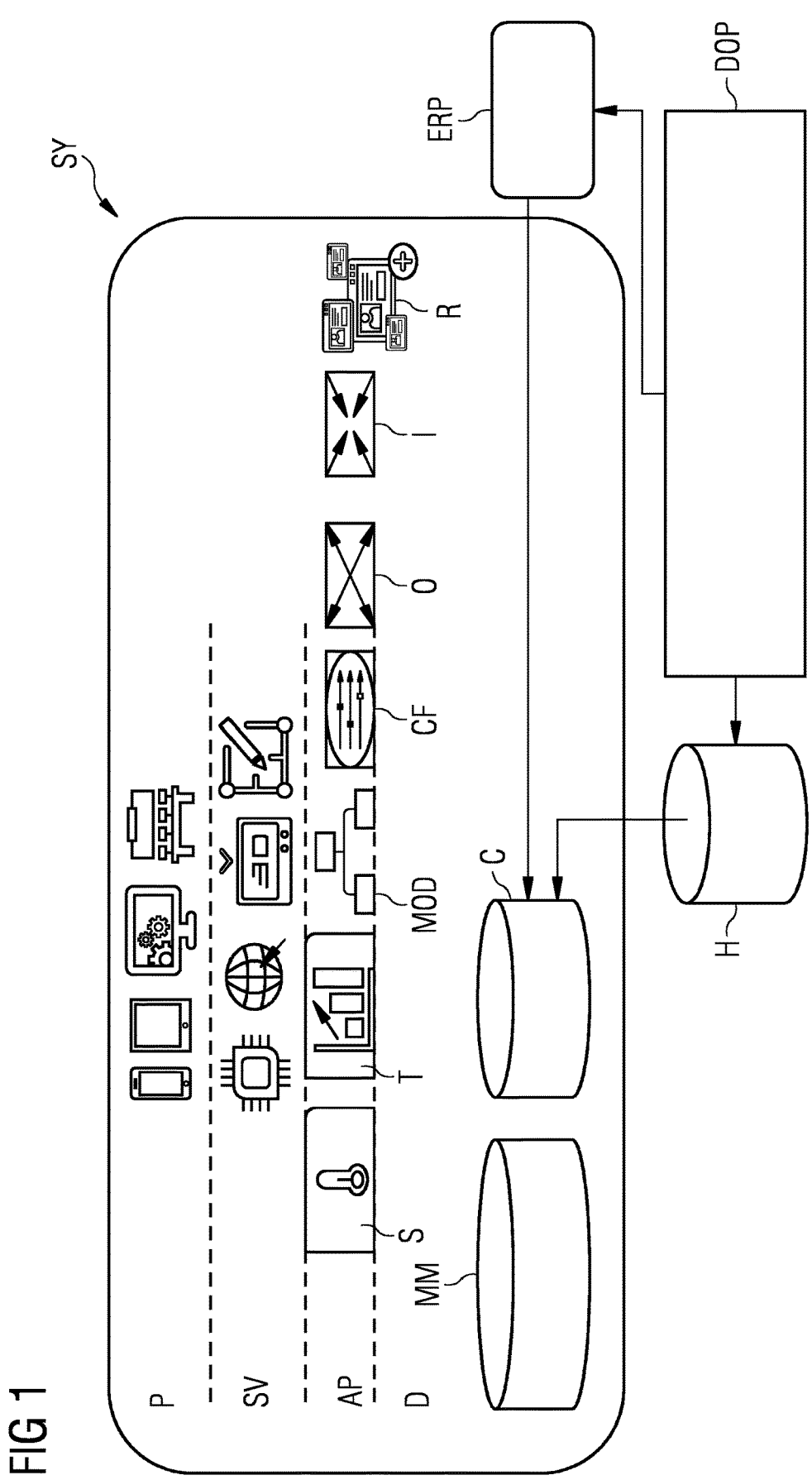

(58) Field of Classification Search
USPC .................................................. 717/100–167
See application file for complete search history.

(56) References Cited

U.S. PATENT DOCUMENTS

| | | | | |
|---|---|---|---|---|
| 9,740,992 | B2* | 8/2017 | Fazal | .................... G06Q 10/063 |
| 10,318,399 | B2* | 6/2019 | Tuffs | .................... G06F 11/3428 |
| 2002/0099563 | A1* | 7/2002 | Adendorff | ............ G06Q 10/067 |
| | | | | 705/348 |
| 2005/0278703 | A1* | 12/2005 | Lo | ........................ G06F 11/0709 |
| | | | | 717/169 |
| 2020/0090088 | A1 | 3/2020 | Arora et al. | |

OTHER PUBLICATIONS

Shin, Yonghee, et al. "Evaluating complexity, code churn, and developer activity metrics as indicators of software vulnerabilities." IEEE transactions on software engineering 37.6 (2010): pp. 772-787. (Year: 2010).*

Pang, Toh Yen, et al. "Developing a digital twin and digital thread framework for an 'Industry 4.0'Shipyard." Applied Sciences 11.3 (2021): 1097. pp. 1-22 (Year: 2021).*

* cited by examiner

SYSTEM AND COMPUTER-IMPLEMENTED METHOD FOR CONTROLLING A SOFTWARE DEVELOPMENT AND OPERATIONS SYSTEM ON THE BASIS OF MEASURED QUALITY DATA REPRESENTING AT LEAST ONE QUALITY AND/OR PERFORMANCE INDICATOR

CROSS-REFERENCE TO RELATED APPLICATIONS

This application claims priority to EP Application No. 22185136.3, having a filing date of Jul. 15, 2022, the entire contents of which are hereby incorporated by reference.

FIELD OF TECHNOLOGY

The following relates to a support system and to a corresponding computer-implemented method. The support system—may be computer-implemented—comprises at least one processor suitable for executing software modules and a transitory and/or permanent storage to be coupled with said processor(s), whereby the support system is configured to process measured quality data representing at least one quality and/or performance indicator for controlling a software development and operations system, abbreviated as DevOps system, developed and/or operated by enterprise resources.

BACKGROUND

An enterprise (or entity of an enterprise) can provide software development and/or operation of a technical system (e.g. a production plant, energy plant or energy transport system etc.). Such DevOps system are software intensive, i.e., software is essential for providing the promised functionality. Depending on its organization evolution level, resources of the enterprise plan and control the value of software and therefore the software intensive system.

Potential approaches to balance engineering requirements and tasks with respect to functionality, quality, time and/or expenses rely on different definitions.

In traditional value engineering (VE) the focus is on the repetitive process of production, which is natural in such an environment. In a hardware-oriented process of production value analysis supporting new product (production) design is applicable. The analysis applies to the design of new products equally as well as to the existing apparatus and to a periodical examination of products of the latest developments. The focus on hardware, products and repetitive (production) expenses does not apply for software engineering which is a creative process and less 1:1 repetitive. Once, the software artefact is built and tested, the production of new software modules requires very little effort.

For software the obvious solution was and is the use of earned value management (EVM) and value engineering, a known project management technique for measuring project performance and progress in an objective manner.

In contrast to the usual use of the term "value" in software development where a parameter/variable contains a value or is set by a value, value in the context of VE/EVM means the ratio between function (for a user or customer) and cost.

EVM implementations for large or complex projects include many more features, such as technical performance indicators and forecasts of expenses performance and schedule performance (behind schedule or ahead of schedule). A straightforward application of these organizational methods does not work for software and software intensive systems.

The main technical problem is that software objects are abstract and intangible compared to hardware objects being concrete tangible. Views on objects exist but properties of these views are often not properties of the abstract objects. There is no tangible object even in operation (application). Measurable is only the effect and representation in the system at a point in time but not the object itself.

Communication and aggregation of results is a challenge as system size, distribution, speed of operation leads to a vast quantity of data that needs to be processed and aggregated.

Due to system and organizational size and speed of technological change and improvement, the development and operation of the software intensive system must be guided and has to be developed step by step.

There is a need for a method to improve software capability based on measurement of properties of software objects used in software lifecycles.

In view of this, an aspect relates to present an improved concept or method or system that allows for an efficient quality and performance measurement and evaluation of a software intensive system.

SUMMARY

An aspect relates to a support system comprising at least one processor suitable for executing software modules, whereby the support system is configured to process measured quality data representing at least one quality and/or performance indicator for controlling a software development and operations system, abbreviated as DevOps system, developed and/or operated by enterprise resources, further comprising:

- a configuration module used to set up connectors to at least one history data source of said DevOps system and/or to at least one enterprise resource planning data source,
- an input interface module configured to import a data model (matrix) including predefined model parameters with predefined initial values whereby the data model represents a current evolution degree of a plurality of evolution degrees in operation of the enterprise resources,
- a modeler module comprising the data model, whereby the modeler module is configured to aggregate data via the connectors from said data sources based on the predefined model parameters and to assign measured values of the aggregated data to the corresponding model parameters,
- a recommender module configured to analyze the current evolution degree depending on the assigned values, to estimate a quality and/or performance trend derived from the evolution degree and from the aggregated data from the at least one history data source and
- an output interface to output at least one message containing recommendation for at least one action to be taken for controlling the DevOps system whereby the at least one action is derived from the analyzed evolution degree and estimated quality and/or performance trend.

The needs of the organization and project shall be incorporated. This can be expressed by an evolution (maturity) level.

Due to system and organizational size and speed of technological change improvement should be guided and should be incrementally improved based on automated measurement. Focus is on actionable measures (so called KPIs)

which are used to reach appropriate maturity-level of the system. It can start simple at low maturity level and improve during the project incrementally such that upfront engineering remains minimal.

The recommender module can be coupled/connected to a user interface presenting various views of the abstract objects and if required showing the at least one message for user interaction.

The data model can be designed as a matrix.

The at least one action as a measure can be taken to raise said evolution degree if an introduction of a new abstract object results in falling below at least one predefined threshold by at least one measured value.

The at least one action as a measure can be taken is a rollback measure if an introduction of a new abstract object results in exceeding at least one predefined threshold by at least one measured value.

The system can further comprise a storage configured to record a track point to a new abstracted object if the estimation of a quality and/or performance trend does not fit to measured values after introduction of the new abstract object.

A benefit of the proposed system is the combination of KPI systems with artifact base maturity model aligned with a proposed outcome and provide integration into automated Software Engineering Tools and ERP systems.

The system allows a high automation grade, seamless integration to functional and quality models, and is auditable.

Agile/lean process principles are integrated. Embrace change and scaling. It can provide interface to hardware engineering guided by leverage VE. There is a close feedback loop to software creation/development.

Embodiments of the invention further include an implemented method for controlling a software development and operations system, abbreviated as DevOps system, based on measured quality data representing at least one quality and/or performance indicator, whereby the DevOps system is developed and/or operated by enterprise resources, comprising the following steps:
- setting up connectors to at least one history data source of said DevOps system and/or to at least one enterprise resource planning data source,
- importing a data model including predefined model parameters with predefined initial values whereby the data model represents a current evolution degree of a plurality of evolution degrees in operation of the enterprise resources,
- aggregating data via the connectors from said data sources based on the predefined model parameters and assigning measured values of the aggregated data to the corresponding model parameters,
- analyzing the current evolution degree depending on the assigned values, to estimate a quality and/or performance trend derived from the evolution degree and from the aggregated data from the at least one history data source and
- outputting at least one message containing recommendation for at least one action to be taken for controlling the DevOps system whereby the at least one action is derived from the analyzed evolution degree and estimated quality and/or performance trend.

The one or more processors can be distributed organized on servers or in a cloud.

Embodiments as described above for the system can be analogous applied for the method and for a computer program product (non-transitory computer readable storage medium having instructions, which when executed by a processor, perform actions) and for the computer-readable storage medium.

This system and the device can be implemented by hardware, firmware and/or software or a combination of them.

The computer-readable storage medium stores instructions executable by one or more processors of a computer, wherein execution of the instructions causes the computer system to perform the method.

The computer program (product) is executed by one or more processors of a computer and performs the method.

BRIEF DESCRIPTION

Figure 2:
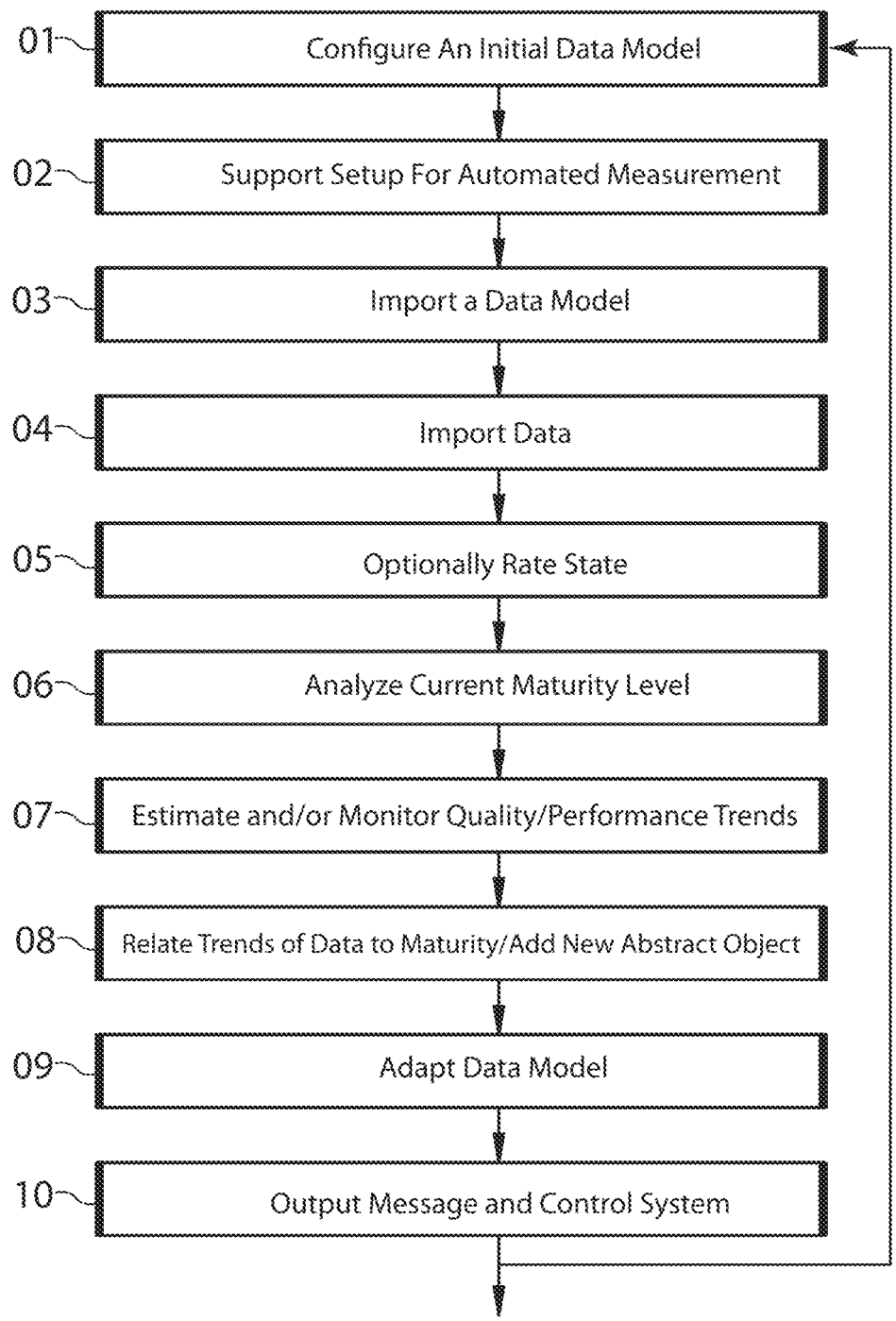

Some of the embodiments will be described in detail, with reference to the following figures, wherein like designations denote like members, wherein:

FIG. 1 illustrates an overview of the support system; and
FIG. 2 shows a flow chart of steps of the inventive method.

DETAILED DESCRIPTION

In the context of embodiments of the invention the following definitions are given:

Enterprise Resources:

Comprise technical resources like storage or other hardware components, occupying processor for processing, services like maintenance and development, planning and control resources like planning software tools which interact with users and comprise software modules interacting to each other.

Organization:

Enterprise resources are organized within an enterprise or entity of that enterprise. Finally, the organization provides software development and/or operation of a software intensive system.

Technical System:

As used herein, the term "a technical system" refers, for example, to a device, apparatus or a plant. A technical system can, for example, be a field device. Typically, the technical system comprises a plurality of interconnected hardware components and/or software modules. Furthermore, the technical system can, for example, comprise at least one component having a communication interface configured to connect an apparatus to an environment, user and/or other system.

Components/Modules:

Here and in the following, the interface component, the data storage components as well as other components referred to, may for example be software modules of a computer program for carrying out the computer-implemented method. Alternatively, the modules may interact with respective hardware components with software for carrying out the respective steps stored on them.

Data Model:

A data model is an abstract model that organizes elements of data and standardizes how they relate to one another and to the properties of real-world entities. For instance, a data model may specify that the data element representing a car being composed of a number of other elements e.g. wheels, chassis. The color of the chassis and size of the wheels represents properties of the data elements. Relations between the elements, also called objects, can be represented by a graph or a matrix with elements in the matrix rows and columns and an elements' relationship representing value (e.g. 0 or 1) in the array.

Maturity Model:

Maturity Model:

Maturity models (for software) like Capability Maturity Model Integration (CMMI) is a process level improvement training and appraisal program. It is required especially in software development. CMMI can be used to guide process improvement across a project, division, or an entire organization.

Maturity model described herein uses 4 development efficiency activities, organizational ratings for DevOps resources and suppliers:

Level 0: undefined:

Basic state without any expectations. It could be the initial level.

Level 1: discover and specify:

The concept is (at least) described as a hypothesis with the intent to begin using it in a defined scope. Depending on the organizational principles it entails the permission of its usage and/or a consent of a (small) circle of stakeholders to progress toward a related goal. A stakeholder normally has a specific interest in and knowledge of a (software) product.

Level 2: experiment and/or practice:

The concept is (at least) described as a hypothesis with the intend to begin using it systematically in a defined scope. Depending on the organizational principles it entails the permission of its usage and/or a consent of a (small) circle of stakeholders to progress toward a related goal.

Level 3: measure:

The concept and its practices are qualitatively controlled. Qualities are described, measured, goals are set and followed up. Success of quality control is apparent and aligned with a larger organizational context.

Level 4: quantitatively controlled:

The concept and its practices are quantitatively controlled in a comprehensive way (coverage included). The goal here is prediction of the outcome of the concept application in the organization.

Level 5: optimizing value:

The quality of a concept is quantitatively measured such that an overall best (optimum) in the context of the organization is targeted (and achievable). This concerns the described contents, the affected processes and especially the customer value targeted.

Level 6: overcome, master, transcend:

The concepts underlying cause, challenge or problem is to overcome in a way that it needs no more attention. Spending is minimized in such that it goes unnoticed.

KPI (Key Performance Indicator):

In software development a KPI may represent performance and/or quality of a system and/or software development organization like availability and reliability like downtimes, regular software update cycles, hardware expenses if hardware need to be exchanged, meeting Service Level Agreements, rate of project completion in time, average time to solve a support ticket and so on.

Software Artifact:

An artifact is a by-product of software development that helps to describe the architecture, design, and function of software. Artifacts are like roadmaps that software developers can use to trace the entire software development process. Technically, artifacts can be databases, data models, printed documents or scripts. Artifacts aid in the maintenance and updating of software, as developers can use them as reference material to help resolve issues. Artifacts are documented and stored in a repository so they can be retrieved by software developers upon demand.

Abstract object: An abstract object represents a software module or a resource used by the software module or a resource operating with the software module.

Operationalization:

In the context of this application, operationalization adds the measurements to the model.

Create Configuration:

Creates the configuration of measurement tools to execute the measurement. May contain data input estimation/forecast or default values where automatic measurement is missing.

Evaluation:

Processing of observation data created based on measurement configuration.

Improvement:

Improvement comprises model improvement and/or artifact improvement.

DevOps System: an entity/enterprise can provide software development and/or operation. Different processes in the software development/engineering like programming, tests and deployment of various software modules are linked with software version control and failure management during operation. They work together with a permanent or frequent feedback loop.

FIG. 1 illustrates an overview of the support system.

Maturity concerning creation of a value-added outcome for software and software intensive systems can be determined systematically and built up in a project to the organizational needs. Selected software artefacts shall be automatically measurable. A software or software intensive system can start from low maturity level with little upfront engineering supporting agile and lean process models.

Definition and alignment what outcome and expenses means in practice and how they are to be measured and aggregated. Innovative is the integration of the outcome and expenses for functionality and quality for development and operation by means of one integrated model. The support system takes the dynamic feedback nature of DevOps systems into account. Nontechnical requirements (like prioritizing customer preferences, or time to value etc.) can also be integrated with technical development and operations needs in closed and defined feedback loops.

Maturity models (for software) can be described in detail by a detailed analysis and improvement matrix (DAIM). Measurement values and predicted trends of KPIs which communicate the state of the DevOps system are incorporated into the DAIM. The underlying data model representing a current evolution degree of a plurality of evolution degrees for the project is incrementally built up based on a predefined maturity model. The needs of the organization and project determine the coverage and the precision required for measurement. It may range the needs for ratings (maybe by user interaction) to enable completely automated measurement with prediction quality. Measurement and rating are artifact centered and therefore technical to be as close as possible to the outcome available in the organization.

Performance indicators show trend and deviation from a (predefined) goal. Proposed performance indicators are e.g. resources, customer needs, and excellence. If a functional engineering strategy exists, deviation from the strategic goals of the engineering strategy can be used. Otherwise, trend and deviation form maximum or overall average are considered. Functional strategies are known from EP 3961382 A1. This patent application discloses a method for automatic derivation of attributes of software engineering artifacts, involves mapping deduced technical requirements of artifacts to engineering disciplines and concerns by an automated software-based process. The calculated engineering artifacts are mapped to responsibilities. The mapping results are evaluated based on software metrics. The classification of the technical boundary condition is adaption based on the evaluation results in iterations.

In FIG. 1 there is a four layered approach to describe the decomposition of the support system to describe the required modules in more detail.

Presentation layer P: SW modules to present the system data on the common devices like mobiles (apps), tablets (web pages), PCs or control centers (web or applications).

Presentation server SV: Data formats are created and messages from the different devices are collected. This requires modules for APP (Application) data generation, or Web data formats, or 3D Objects with a layout service.

Application layer AP: Above mentioned use-cases handle sensitive data of the respective organization. Therefore, we need to provide user accounts with access rights based on data and functionality (Accounts module). Data access needs to be restricted accordingly by the data access module, which additionally provides an abstraction to the different underlying eventually distributed datastores.

The support system SY comprises the following modules:

A configuration module CF creates a configuration for connectors C and sets up one or more connectors either to a history data source H e.g. a time and/or event series database (historian) and/or to enterprise resource planning data resource ERP. Data sources H and/or ERP can be outside the support system.

The configuration module allows to flexibly specify how to access history data sources or DevOps systems. Typically, this is the location of the services (e.g. using URIs) and additional parameters needed to access these services, like credentials, access tokens and similar aspects. As many different data sources (e.g. SAP systems, Prometheus data sources, Elastic Search data sources, issue management systems) have to be accessed, the configuration module allows configuration of the data sources by means of an extensible domain specific language (DSL).

Input interface module I supports import and/or loading of a new data model, in particular a DAIM.

The input interface module allows importing, setting and changing the thresholds of all defined (quality and/or performance) indicators, in particular KPIs, depending on the maturity level. Therefore, the rows of the matrix (data for one indicator) are separated in columns (maturity levels) that define the required thresholds for each maturity level. One example of an indicator could be the so called "Technical Depth", that is typically allowed to be higher on lower maturity levels and is required to reach a defined lower value at higher maturity levels. The importing and setting mechanisms of the import interface module provides logic that ensures consistency of the provided data.

Modeler module MOD facilitates the evolution of the data model MM, in particular a maturity model, for new abstract objects, views measurement and KPIs. The modeler module allows to specify aggregation rules for at least two dimensions. One dimension are the different stakeholders of the system (potentially aggregated to groups of stakeholders and groups of groups of stakeholders). Examples for stakeholders are "Architect", "Tester", "Product Owner". This dimension is necessary as specific stakeholder are interested in different indicators and KPIs and potentially have different aggregation needs. The other dimension is the functionality dimension, where functions can be grouped to features, features grouped to products, products to product families, etc. A two or more-dimensional matrix allows to specify by means of the modeler module how to aggregate several indicators (e.g., customer satisfaction index, number of incidents, number of person identification errors) interesting for the role "Architect" for a specific feature (e.g. person identification based on fingerprint) of the product (e.g. building information system) in a way that it can be determined later whether the requirements are fulfilled. The specification of the aggregation mechanism makes use of a domain specific language (DSL) for aggregating and evaluation of the provided data. Evaluation means, that indicator values are not just aggregated, but can be evaluated by means of a freely chosen grade, like "A", "B" or "C". The specification of the evaluation is independent of the aggregation and should help users understanding the aggregated values assigned to the above-mentioned matrix elements.

A Measurement application S is based on parameter definitions in the data model and aggregates data from various data sources e.g. H, ERP for the modeler module, which assigns measured values to the corresponding model parameters.

A trend estimation application T is based on parameter definitions in the data model and aggregates data form various data sources, e.g. H, ER for a recommender module R.

A recommender module R analyzes the current evolution degree (based on the collected/aggregated technical data) and estimates the quality and/or performance trend from executing the application T. The recommender module can provide recommendations and/or reports corresponding to the aggregated/estimated data.

The recommender module analyses (using machine learning techniques) the evolution of indicator data over time and identifies those indicators that need attention. The recommender module considers different aspects, like importance of the indicator, number of stakeholders interested in the indicator, importance of features to identify those indicators that need a recommendation. The recommender module has knowledge about the individual indicators and their trends which can be derived from the current maturity level, from the aggregated and history data and which actions could be suggested to achieve a certain maturity level. If the recommender module finds out that a certain feature of a product (e.g. person identification based on fingerprint) is not trustworthy anymore (e.g. the number of person identification errors is below the defined threshold in the interface module), the recommender module would suggest to improve testing effort with an emphasis on random tests. The recommender module therefore has different recommendations depending on the indicator and also depending on the maturity level of the organization.

An output module O which is responsible for presenting reports and/or outputting one or more recommendation messages for at least one action to be taken for controlling a DevOps system DOP. The message can be derived from the evolution degree of the data model and estimated quality and/or performance trend provided by the trend estimation application. The output module can be coupled/connected to a user interface of at least one of the devices in said presentation layer presenting various views of the abstract objects and reports and—if required—showing at least one message for user interaction, e.g. confirmation by the user.

The output interface is capable to output at least one recommendation message. The form of the message can be a listing all the recommendations given. The output interface allows filtering of recommendations based on indicators, features, importance, trustworthiness, stakeholders, stakeholder groups etc. Furthermore, the output interface provides detail information for each recommendation in a way that it helps to understand the reason for the recommendation in principle and why a specific action (for improvement) is suggested.

the history data source H can be part of the DevOps system. Its data can be imported via said connectors.

a not shown storage of the support system can record a track point to a new abstracted object if the estimate of a quality and/or performance trend does not fit to measured values after introduction of the new abstract object.

In the case that the estimate is a quality and/or the performance trend fits to measured values after introduction of the new abstract object then the evolution degree of the data model can reach a higher evolution level, also called maturity level. In order to limit a permitted deviation from exactly fitting a threshold can be predefined.

The proposed system changes DevOps systems under behavior observations based on the collected data and estimations automatically by reverting changes (rollback) with the aid of the recorded track points, stopping runaways, enhancing resources in an affordable (controlled) way.

It improves the outcome (in development) by transparency and reduces workload by automatically assigning found issues to abstract object responsibilities. This requires an automated measurement and aggregation even in mid-sized systems and supported setup and maintenance for larger systems.

FIG. 2 shows a flow chart of steps e.g. 01 to 10 of the inventive method. An example could be a system to switch sustainably high voltage electrical current. This system is a very simplified DevOps system. A more complex software intensive system is typical for software development and operations systems. The complexity in the example is reduced in order to understand the features of the inventive system and method. The scope of embodiments of the invention are not reduced to this simplified example.

A maturity upgrade can be driven by the change of the understanding of sustainability in the customers domain.

An example for the maturity levels (ML):
ML 0: Switch can be used several times. (Note: that there are one time usage switches)
ML 1: Protective gas inside the switch is declared an environmental issue.
ML 2: Containment of protective gas needs to be reported.
ML 3: Quantity of leaked protective gas needs to be reported.
ML 4: Usage of protective gas must be reduced.
ML 5: Availability of protective gas is restricted.
ML 6: Usage of protective gas needs to be discontinued.

The system is—for instance—developed in the following Development levels (DL) to fulfill the higher maturity levels.

DL 0: System is designed purely electromechanically. Electrodes are mechanically separated at high speed.

The casing of the switch holds protective gas. Plasma created at switching time (which would destroy the switch) is blown out by the protective gas.

Protective gas consumed in the process is mostly recovered. With an expected low frequency of switching the switch lasts for decades. Checking gas pressure and refill can be done in long maintenance intervals.

DL 1: Label all vessels containing protective gas.
DL 2: Add pressure control with an interface to monitor the system, which is responsible for protocolling gas loss events.
DL 3: Add advanced pressure sensors to estimate content and loss of protective gas. (Not recovered gas and mini leakage)
DL 4: Set goals for protective gas usage and implement a (software) module to control the system goals with respect to gas loss in the contributing system parts.
DL 5: Improve electrodes, faster switching, enhanced speed of gas flow, gas tight mechanics to move electrodes etc.
DL 6: Change to vacuum switches and disuse protective gas. Enablers are tight fittings and controlled gas volume for mechanical systems (high momentum) and monitoring.

The following quality and performance indicators as KPIs can be measured and controlled:
KPI 0:
Not needed.
KPI_1:
The minimum is a list of labeling regulations with effectivity date. Threshold can be a fulfillment grade of labeling.
KPI_2:
Sensor capabilities, gas leak event and causes, rough estimation of sensor system effectivity (quite gross grain). Compare protective gas purchased and estimate balance between accounted and unaccounted gas losses. Define a threshold for a maximum deviation between the accounted and unaccounted gas loss.
KPI_3:
Monitor definition, creation, and operation of monitoring system. Indicators with threshold could be monitored use of protective gas and lost protective gas.
KPI_4:
Based on data gathered in KPI level 3 set goals aligned with customer and regulatory needs.
KPI SYS 5:
Measure: define and control system parameters that indirectly influence protective gas usage and balance.
Control and balance are to be done at switch definition, creation, installation and operation phase.
Candidates for such parameters are electro-erosion, switching speed, volume of the case for the protective gas, flow volume, fittings wear and tear and voltage control. Goal is to reduce the plasma arc and its destructive effects.
KPI_6:
Reuse of the KPIs for the systems is possible: gas containment to be enabled in a vacuum containment and high momentum mechanics, improved electrode design and voltage control to entirely remove protective gas from system.

Step 01: Configuring an initial data model, in particular a maturity model for the respective software engineering project based on the assumed/assessed maturity level e.g. ML 1 of the project. If no maturity level is given for a project assume the lowest maturity level e.g. ML 0;

02: Support setup for automated measurement of new abstract object views, generated artifacts, DevOps system behavior or optionally a configuration module;

03: Import a data model, in particular a DAIM (see above), with measurements and KPIs;

04: Import data from the enterprise resource planning data source ERP and from a history data source, wherein data are time-based and/or event-based measured/generated. (e.g. OSLC* Interface, data exchange format, native APIs, Rest API (Application programming Interface), Open Services for Lifecycle Collaboration (OSLC);

05: Optionally rate state per abstract object and view; Rating should be anonymous and not accessible from outside of the project;

06: Analyze the current maturity level of the project; If maturity level ML 2 is given in this simplified example, then sensors measure gas leakage events. Quality and/or performance indicator (e.g. KPI 2) could be the maximum deviation between the accounted and unaccounted gas loss.

07: Estimate and/or monitor quality/performance trends per abstract object which can be derived from the imported data considering the maturity level of the project. This step can be carried out completely in an automatic manner.

08: Relate trends of data to maturity, aggregated KPI, measures of abstract object, views;

08: Add the new abstract object, measured KPI data; In the simplified example: if measured KPI data reach the maximum deviation several times then a threshold can be set to initiate at least one message with a recommendation.

09: Adapt DAIM with the new abstract object to create a recommendation message for at least one action to be taken (e.g. rollback, stopping runaways, enhancing resources). The action can lead to a higher maturity level. In the simplified example the action can be a level 3 development (DL 3) that means: sensors (of level 2) shall be enhanced or changed. Enhanced/changed sensor are capable to measure gas pressure to estimate volume and loss of protective gas.

10: output the message and control a DevOps system according to the recommended action.

The above-described method can be repeated until a desired maturity has been reached.

Embodiments of the invention have been described in detail with reference to embodiments thereof and examples. Variations and modifications are possible. Instead of the above-described production process one or more processes can analogously be applied to other technical systems.

The support system can be (computer-)implemented for performing the inventive method steps.

This system can be integrated into a (computer) cloud system. It includes one or more processors and can be coupled with data, where said processor(s) is/are configured to execute the method steps.

The method can be executed by at least one processor such as a microcontroller or a microprocessor, by an Application Specific Integrated Circuit (ASIC), by any kind of computer, including mobile computing devices such as tablet computers, smartphones or laptops, or by one or more servers in a control room or cloud.

For example, a processor, controller, or integrated circuit of the system and/or computer and/or another processor may be configured to implement the acts described herein.

The above-described method may be implemented via a computer program (product) including one or more computer-readable storage media having stored thereon instructions executable by one or more processors of a computing system and/or computing engine. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. A processor performs or executes the instructions to train and/or apply a trained model for controlling a system. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

In addition, and alternatively, it is possible that a control device receives other computer-readable control signals in order to initiate the mentioned steering/control process by its processor(s).

The terminology used herein is for the purpose of describing particular embodiments only and is not intended to be limiting of example embodiments of the invention. As used herein, the singular forms "a", "an", and "the" are intended to include the plural form as well, unless the context clearly indicates otherwise.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A support system comprising at least one processor suitable for executing software modules, whereby the support system is configured to process measured quality data representing at least one quality and/or performance indicator for controlling a software development and operations system, abbreviated as DevOps system, developed and/or operated by enterprise resources, further comprising:
  a configuration module used to set up connectors to at least one history data source of said DevOps system and/or to at least one enterprise resource planning data source,
  an input interface module to for importing a data model including predefined model parameters with predefined initial values whereby the data model represents a current evolution degree of a plurality of evolution degrees in operation of the enterprise resources,
  a modeler module including the data model, whereby the modeler module aggregates data via the connectors from the data sources based on the predefined model parameters and to assign measured values of the aggregated data to the corresponding model parameters, and
  a recommender module for analyzing the current evolution degree depending on the assigned values, to estimate a quality and/or performance trend derived from the evolution degree and from the aggregated data from the at least one history data source and
  an output interface to output at least one message containing recommendation for at least one action to be taken for controlling the DevOps system whereby the at least one action is derived from the analyzed evolution degree and estimated quality and/or performance trend.

2. The system according to claim 1, wherein the data module comprises abstract objects, whereby an abstract object represents a software module or a resource used by the software module or a resource operating with the software module.

3. The system according to claim 2, wherein the recommender module is coupled/connected to a user interface presenting various views of the abstract objects and if required showing the at least one message for user interaction.

4. The system according to claim 1, wherein the data model is designed as a matrix.

5. The system according to claim 1, wherein the at least one action to be taken is a measure to raise the evolution degree if an introduction of a new abstract object results in falling below at least one predefined threshold by at least one measured value.

6. The system according to claim 2, wherein the at least one action to be taken is a rollback measure if an introduction of a new abstract object results in exceeding at least one predefined threshold by at least one measured value.

7. The system according to claim 1, wherein the system further comprises a storage configured to record a track point to a new abstracted object if the estimation of a quality and/or performance trend does not fit to measured values after introduction of the new abstract object.

8. A computer-implemented method for controlling a software development and operations system, abbreviated as DevOps system, based on measured quality data representing at least one quality and/or performance indicator, whereby the DevOps system is developed and/or operated by enterprise resources, comprising the following steps:
- setting up connectors to at least one history data source of the DevOps system and/or to at least one enterprise resource planning data source,
- importing a data model including predefined model parameters with predefined initial values whereby the data model represents a current evolution degree of a plurality of evolution degrees in operation of the enterprise resources,
- aggregating data via the connectors from the data sources based on the predefined mo del parameters and assigning measured values of the aggregated data to the corresponding model parameters,
- analyzing the current evolution degree depending on the assigned values, to estimate a quality and/or performance trend derived from the evolution degree and from the aggregated data from the at least one history data source, and
- outputting at least one message containing recommendation for at least one action to be taken for controlling the DevOps system whereby the at least one action is derived from the analyzed evolution degree and estimated quality and/or performance trend.

9. The method according to claim 8, wherein the data module comprises abstract objects, whereby an abstract object represents a software module or a resource used by the software module or a resource operating with the software module.

10. The method according to claim 8, wherein the at least one action to be taken is a measure to raise the evolution degree if an introduction of a new abstract object results in falling below at least one predefined threshold by at least one measured value.

11. The method according to claim 8, wherein the at least one action to be taken is a rollback measure if an introduction of a new abstract object results in exceeding at least one predefined threshold by at least one measured value.

12. The method according to claim 8, wherein a track point to a new abstracted object is recorded if the estimation of a quality and/or performance trend does not fit to measured values after introduction of the new abstract object.

13. The method according to claim 8, wherein the data model is designed as a matrix.

14. A computer program product, comprising a non-transitory computer readable storage medium having computer readable program code stored therein, said program code executable by a processor of a computer system to implement the method according to claim 8.

15. A computer program product, comprising a non-transitory computer readable storage medium having computer readable program code stored therein, said program code executable by the system according to claim 1 in order to control a software development and operations system.

\* \* \* \* \*